United States Patent [19]

Breeden et al.

[11] Patent Number: 5,203,013
[45] Date of Patent: Apr. 13, 1993

[54] RADIO TELEPHONE SYSTEM SUPPORTING BUSY AND OUT-OF-RANGE FUNCTION

[75] Inventors: Robert L. Breeden; Gary S. Lobel, both of Boynton Beach; Thomas V. D'Amico, Boca Raton, all of Fla.

[73] Assignee: Motorola, Inc., Schaumburg, Ill.

[21] Appl. No.: 579,646

[22] Filed: Sep. 10, 1990

[51] Int. Cl.[5] .......................................... H04B 17/00
[52] U.S. Cl. .................................. 455/34.2; 370/29; 455/54.1; 455/67.7; 455/154.2
[58] Field of Search .......................... 455/32-34, 455/53, 52, 54.1, 54.2, 56.1, 67.1-67.7, 62, 226.1, 229, 161.1, 161.3, 154.1, 156.1, 154.2; 379/59, 60, 61, 63; 370/24, 29, 95.1, 95.3

[56] References Cited

U.S. PATENT DOCUMENTS

| | | | |
|---|---|---|---|
| 4,851,820 | 7/1980 | Fernandez | 455/67 |
| 4,873,711 | 10/1989 | Roberts et al. | 379/58 |
| 4,882,766 | 11/1989 | Ahaiwa | 455/58 |
| 4,953,198 | 8/1990 | Daly et al. | 379/61 |
| 5,049,875 | 9/1991 | De Luca et al. | 455/229 |

OTHER PUBLICATIONS

MPT 1375 Common Air Interface Specification, May 1989.

Primary Examiner—Reinhard J. Eisenzopf
Assistant Examiner—Chi H. Pham
Attorney, Agent, or Firm—Gregg E. Rasor; William E. Koch; Thomas G. Berry

[57] ABSTRACT

A radio telephone communication system (200) comprising a base station with at least one frequency agile transceiver (207) capable of time division duplex operation on at least one radio frequency channel. The base station operates to facilitate communication with at least one radio telephone (100) on the at least one radio frequency channel. The radio telephone communication system further comprises a radio telephone (100) capable of determining an acquisition status of the at least one frequency agile transceiver in the base station, the radio telephone (100) generating an indication representing a base station busy status (402) when one of: requesting a time division duplex communication link fails and bidirectional time division duplex communication is exists on the radio frequency channel; and requesting a time division duplex communication link fails and unidirectional time division duplex communication exists on the radio frequency channel and the unidirectional time division duplex communication originates from the base station.

14 Claims, 6 Drawing Sheets

FIG. 6

RADIO TELEPHONE SYSTEM SUPPORTING BUSY AND OUT-OF-RANGE FUNCTION

FIELD OF THE INVENTION

This invention relates in general to radio telephone communication systems, and more particularly to those systems that support busy (in use) and/or out-of-range conditions and is particularly directed toward a Time Division Duplex (TDD) radio telephone system supporting busy and out-of-range functions.

BACKGROUND OF THE INVENTION

In contemporary telephone systems, the telephone user addresses other radio telephone units or land-line telephones by entering a telephone number that corresponds to the phone system address of the user to be contacted. Once the connection is complete, two way voice or data communications can take place.

With the growing use of portable radio telephone (cellular or CT-2) systems as a mode of communication, there are two normally occurring conditions that can prevent the establishment of a radio frequency link with a base station (e.g. Telepoint): all channels of the base station may be BUSY handling other calls, or the portable radio telephone attempting to access the system may be out-of-range.

It is desirable to be able to indicate to the user which of the two conditions is responsible, because in the BUSY case the user merely needs to wait for a channel to become available, while in the out-of-range case, the user needs to move closer to the Telepoint. It is easy enough to provide status indicators on the radio telephone to visually indicate either the BUSY or the out-of-range condition, but the Common Air Interface (CAI) specification, on which the CT-2 system is based, makes it difficult to determine which of the two conditions has prevented the establishment of a link.

The difficulty in implementing functional BUSY and out-of-range indicators arises because the CT-2 system uses a Time Division Duplex (TDD) transmission scheme on a single RF channel. TDD optimizes the use of the available radio frequency spectrum by allowing transmission of voice and data in both directions between the Telepoint and the portable radio telephone. Specifically, the radio telephone and the Telepoint alternately transmit and receive one-millisecond bursts of information every two milliseconds, one receiving while the other transmits. The CAI specification, however, provides no reliable way for an unsynchronized receiver monitoring an active channel on which a call is in progress to tell whether it is monitoring a transmission from a radio telephone or from a Telepoint at any given moment in time.

Under most circumstances, to originate a call, the user must travel within range of a Telepoint and activate a transmitter in the user's radio telephone, thus placing the call. However, this simple scenario does not address the case where the user cannot determine whether the user is in range of the Telepoint, or if the Telepoint has any channels available for communication.

SUMMARY OF THE INVENTION

Briefly, according to the invention, there is provided a radio telephone communication system comprising a base station with at least one frequency agile transceiver capable of time division duplex operation on at least one radio frequency channel. The base station operates to facilitate communication with at least one radio telephone on the at least one radio frequency channel. The radio telephone communication system further comprises a radio telephone capable of determining an acquisition status of the at least one frequency agile transceiver in the base station, the radio telephone generating an indication representing a base station busy status when one of: requesting a time division duplex communication link fails and bidirectional time division duplex communication is exits on the radio frequency channel; and requesting a time division duplex communication link fails and unidirectional time division duplex communication exists on the radio frequency channel and the unidirectional time division duplex communication originates from the base station.

DESCRIPTION OF A PREFERRED EMBODIMENT

Figure 1:
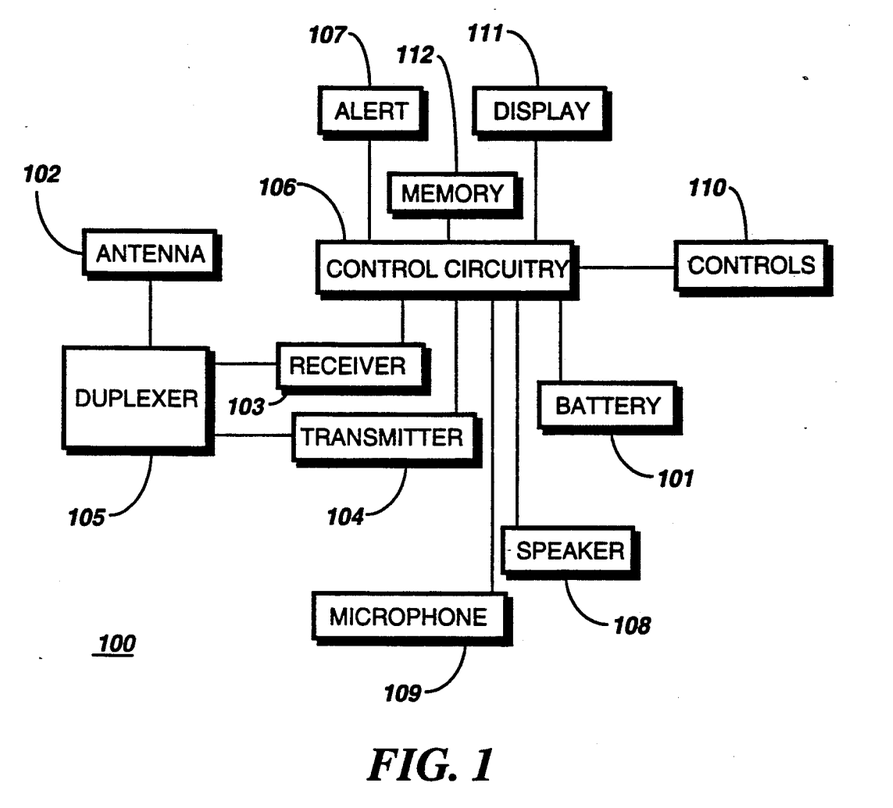
FIG. 1 is a block diagram of a radio telephone suitable for use with the present invention.

Referring to FIG. 1, a block diagram is shown of a battery (energy source) 101 powered radio telephone 100. Operationally, a radio frequency signal is received or transmitted by the antenna 102. The antenna is coupled to the receiver 103 and transmitter 104 by a diplexer 105. The received signal is routed from the receiver 103 to the control circuitry 106 that recovers any information represented by the received signal. The recovered information is then used to activate functions within the radio telephone 100 such as the alert 107 (a ringer in the case of a radio telephone), and after answering the call, sustain the connection. When a connection is established, the user aurally communicates with the other party via the speaker 108 and a microphone 109. Recovered audio from the control circuitry 106 is routed to the speaker 108 which converts electrical energy into acoustical energy thus enabling the user to hear any communications. The microphone 109 is used to convert acoustic energy into electrical energy for use by the control circuitry 106 in modulating the radio frequency carrier produced by the transmitter 104. The user may initiate a call by selecting on a keypad 205 the proper controls 110 representing the number of a party to be contacted.

Before dialing, the desired number is preferably presented on a display 111 which provides visual feedback for the user. If desired, the user may either place the call, edit the number, or abort the dialing operation. When a call is initiated, the transmitting means 106, 104, 105, 102, broadcasts a modulated radio frequency carrier having information representative of the PSTN access codes, both alternate (limited or controlled access) and standard (local). The radio telephone base (Telepoint) or an alternate unit operates to establish a communication link once proper identification is confirmed.

Figure 2:
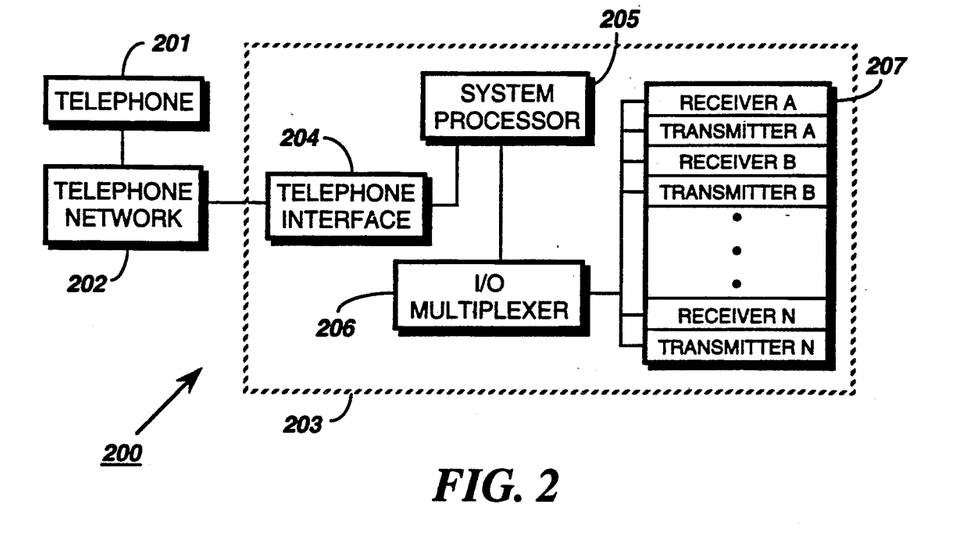
FIG. 2 is a block diagram of a base station suitable for use with a Time Division Duplex (TDD) communication system as discussed in the present invention.

Referring to FIG. 2, a block diagram is shown of a base station system (200). The base station's purpose is to establish and maintain (for the duration of a call) a communication link between a telephone (201) and a radio telephone as shown in FIG. 1. The telephone (201) communicates with the base station (203) via a telephone network (202). The base station is capable of receiving a plurality of telephone links (or lines) using its telephone interface (204) that acts to route the incoming and outgoing traffic to a transmitter/receiver pair as selected by the system processor (205). The system processor (205) controls the telephone interface (204) and allocates via an I/O multiplexer (206) one transmitter/receiver pair per incoming or outgoing telephone line. The transmitter/receiver pairs are part of a bank of frequency agile modular transceivers (207) that can be easily expanded to meet the traffic demands for a particular system. In implementing a system that meets the CT-2 (cordless telephone—two) CAI specification, each transmitter/receiver pair must be capable of time division duplex operation (TDD) over the same radio frequency channel. TDD operation for this application is defined by the alternate transmission and reception, by both the radio telephone and the selected transmitter/receiver pair at the base station, of radio frequency information packets (e.g., digital or analog modulation carrying voice or data information). That is, when one unit transmits, the other unit listens. This information transfer method (TDD) yields the equivalent to a full duplex communication link, on a single radio frequency channel.

Figure 3:
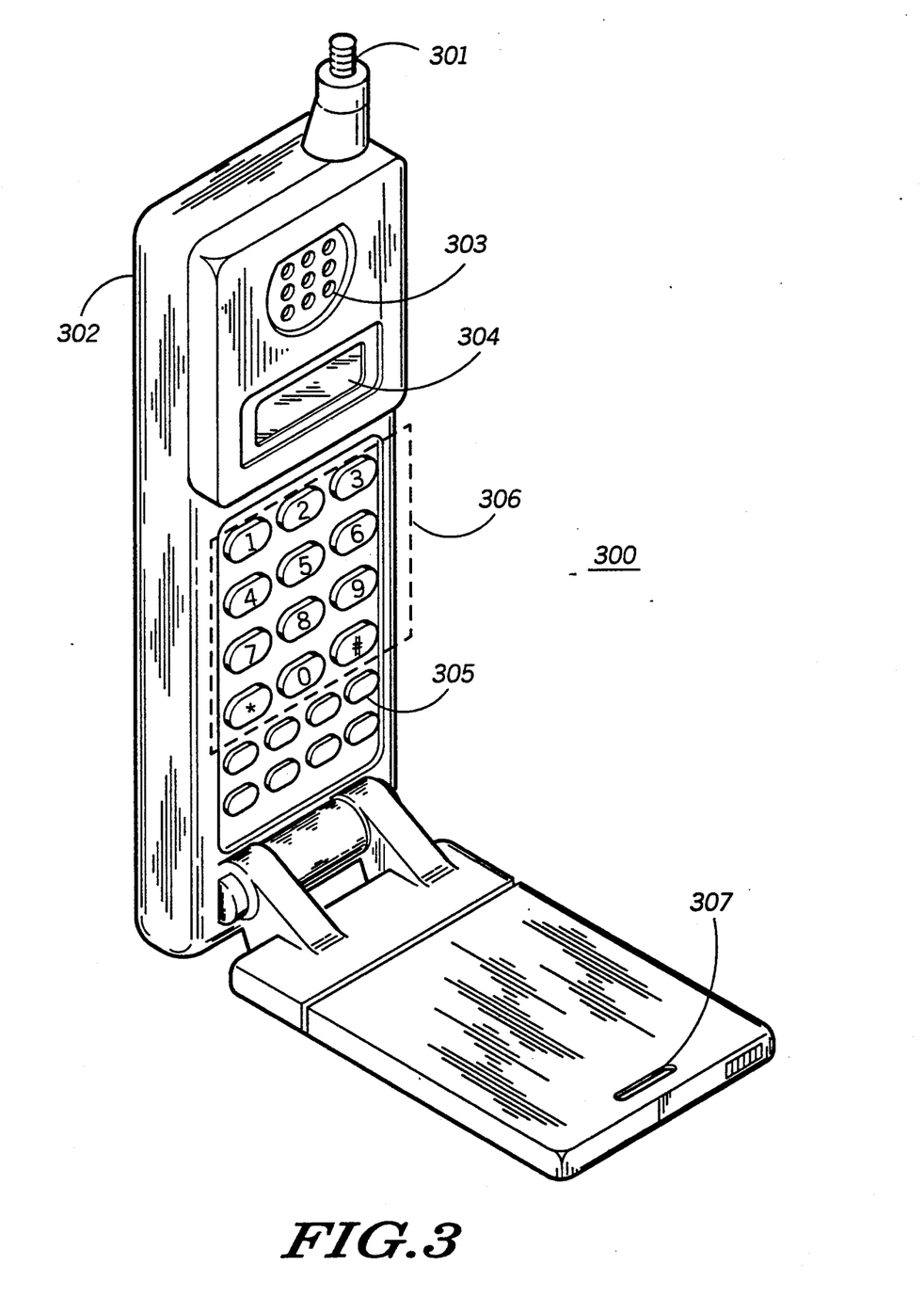
FIG. 3 is an front isometric view of the radio telephone of FIG. 1.

Referring to FIG. 3, the front isometric view of the radio telephone 300 shows the antenna 301, radio telephone housing 302, loudspeaker 303, display 304, control pad including a dialing keypad 306 and associated operational controls 305 such as a clear key, function key, recall key, and function key, and a microphone 307. Electrical contacts (not shown) located on the back of the radio telephone 300 are provided for charging the removable power source in the radio telephone. For example, charging is accomplished by folding the lower articulated portion upward against the control pad 305 then inserting the folded unit into a charging apparatus (not shown). Alternatively, a portable power adapter can be coupled into a power jack located on the radio telephone 300 for charging the power source or supplying external power.

When the user invokes the call mode on the radio telephone 300, the controller circuitry 106 scans the controls 110. Preferably, the user may abort the call mode at any time by entering an "escape" keystroke or waiting for the entry mode to "time out." When the user enters initial digits, the controller processes this first information for acceptance as valid digits and displays the digits. When a valid access code or number has been entered, it is presented, thus providing feedback and allowing the user to accept or reject the code entered. If the digits entered are incorrect the user may press the CLR (clear) function key clearing the present entry and returning to enter new digits. If the digits displayed are correct, the user may choose to dial the number by depressing the SND (send) function key which initiates transmission of the call information. The user may optionally replace the displayed number with a stored number by activating the RCL (recall) function key, entering the stored number's code or memory number, determining if the code is correct and valid, and displaying the newly recalled stored number. The number to be dialed is then presented on a display to the user for verification. The user can then accept or reject the transmission of the number. When the user is ready to transmit the number (initiate a call), the SND (send) function is selected and transmission of the calling information takes place. If the user rejects transmission or, after dialing has been completed, the call initiation sequence returns control to normal standby radio telephone functions.

Figure 4:
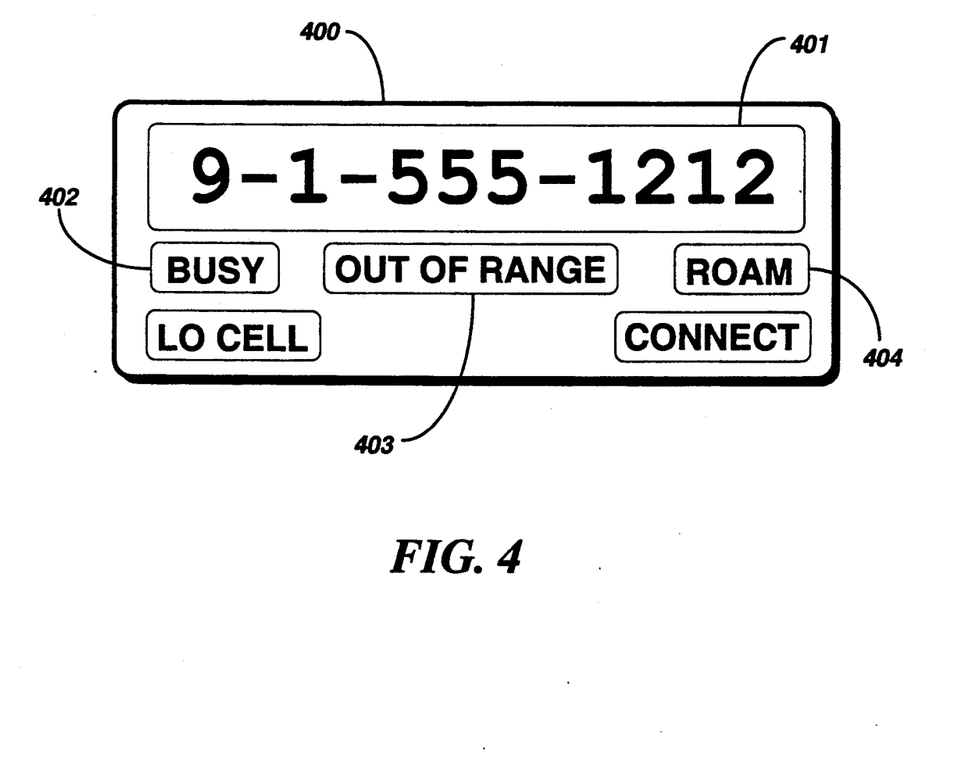
FIG. 4 is an illustration of the information display in FIG. 3 showing BUSY and out-of range indicators in accordance with the present invention.

Referring to FIG. 4, an information display (400) is shown that comprises a character display means (401), a BUSY (402), an OUT-OF-RANGE (403) indicator, and a ROAM (404) indicator. The character display means (401) is capable of presenting either numeric or alphanumeric information representing a phone number or an alias (i.e., a name or phrase) to a phone number.

Figure 5A:
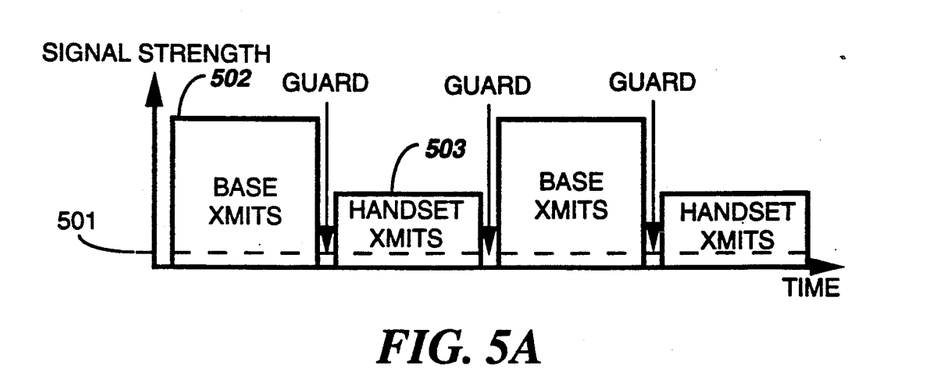
FIG. 5A illustrates TDD transmissions where the received signal strength is above the minimum threshold for both the radio telephone and the Telepoint.

Referring to FIG. 5A, when a radio telephone has attempted and failed to establish link with a base station, the radio telephone receiver may begin a scan of all possible channels in an effort to determine why the failure occurred. If the radio telephone is able to find a channel on which adequate signal strength (greater than a predetermined amplitude, 501) is present in both directions (i.e., continuous bidirectional transmissions with no 1 mS gaps), then it is reasonable to assume that the radio telephone is monitoring transmissions from both another radio telephone (502) and a base station (503), although no determination can be made as to which transmission originates from the base and which from the other radio telephone. In this circumstance, the reason for the failure to establish link cannot be that the radio telephone is out-of-range; therefore, the reason must be that all channels of the base station are busy. Accordingly, in this case, the user should be notified of a channel busy status.

Figure 5B:
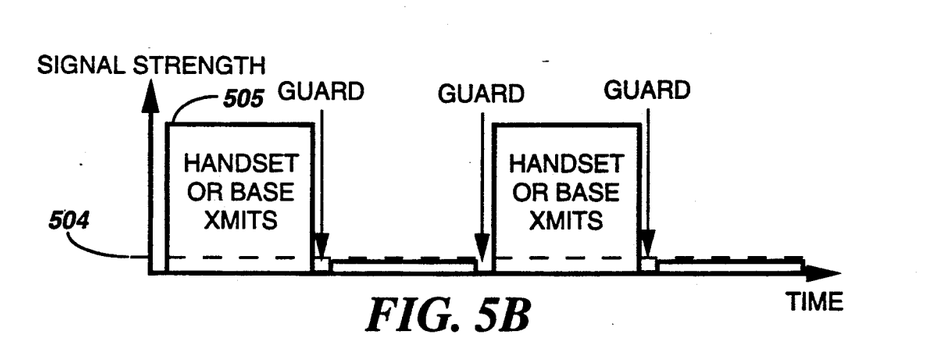
FIG. 5B illustrates TDD transmissions where the received signal strength is above the minimum threshold one of either the radio telephone or the Telepoint.

Referring to FIG. 5B, when a radio telephone has attempted and failed to establish link with a base station, and a scan of all possible CT-2 channels has found no channel upon which adequate signal strength (504) is present in both directions, but has found one or more channels on which there is adequate signal strength in one direction (505) (i.e., 1 mS signals with 1 mS gaps), an uncertainty exists. If none of the signals originate from a base station, the reason for the failure to establish link must be because the radio telephone is out-of-range of any base station. If at least one of the signals originates from a base station, then the associated base station is in range and therefore must be busy would have been established).

Figure 5C:
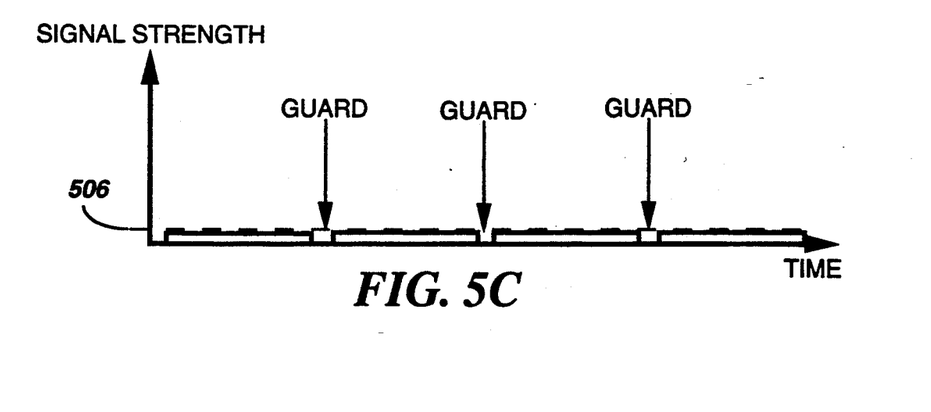
FIG. 5C illustrates TDD transmissions where the received signal strength is below the minimum threshold for both the radio telephone and the Telepoint.

Referring to FIG. 5C, when a radio telephone has attempted and failed to establish link with a base station, and a scan of all possible CT-2 channels has found no channel on which adequate signal strength (506) is present in either direction, it is apparent that the reason for the failure to establish link is that the radio telephone is out-of-range.

Figure 5D:
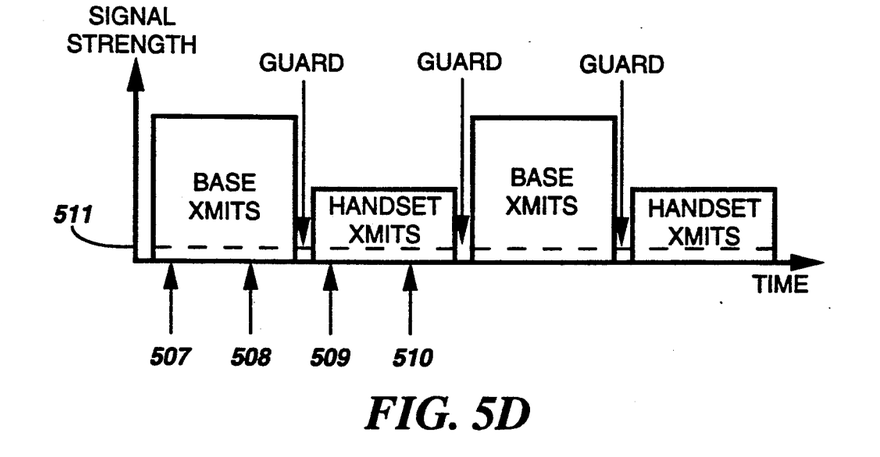
FIG. 5D illustrates TDD transmissions and receiver sample points where the received signal strength is above the minimum threshold for both the radio telephone and the Telepoint.
Figure 5E:
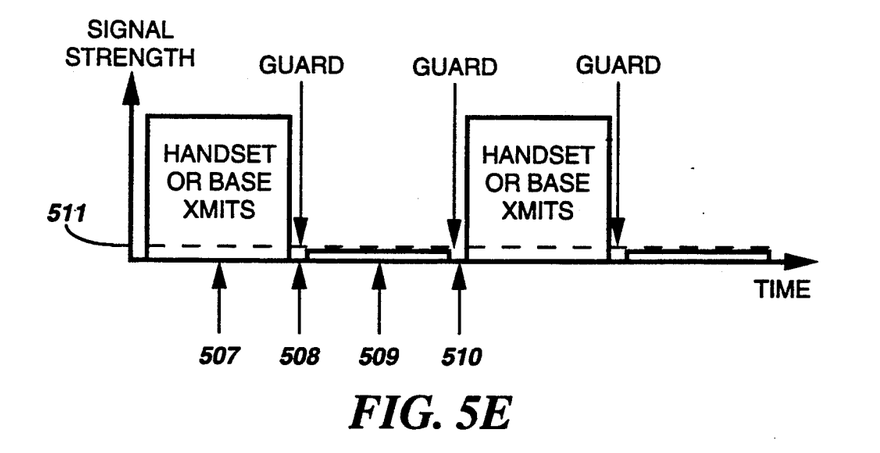
FIG. 5E illustrates TDD transmissions and receiver sample points where the received signal strength is above the minimum threshold one of either the radio telephone or the Telepoint.
Figure 5F:
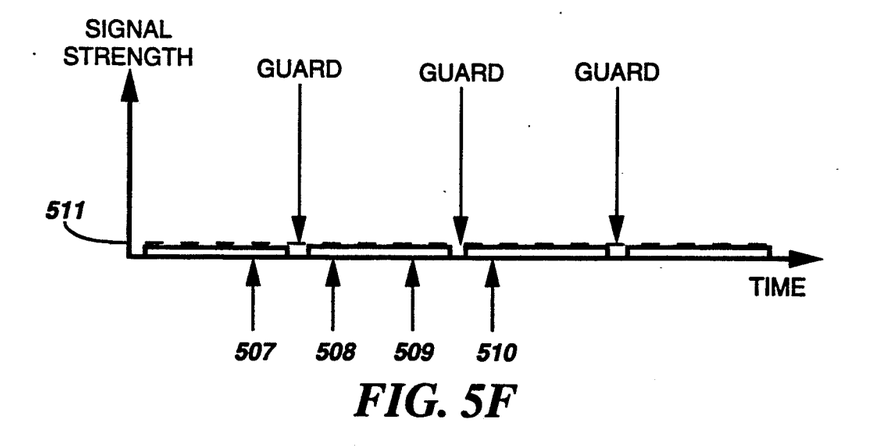
FIG. 5F illustrates TDD transmissions and receiver sample points where the received signal strength is below the minimum threshold for both the radio telephone and the Telepoint.

Referring to FIG. 5D, 5E, and 5F, when a radio telephone has attempted and failed to establish link with a base station, the radio telephone receiver may begin a scan of all possible channels in an effort to determine why the failure occurred. The first step in determining the cause of a failure to establish a link is to measure the signal strength on each of the 40 possible CT-2 channels. Because the radio telephone, having failed to establish a link, is unsynchronized with the base station, a minimum of four signal strength measurements (507, 508, 509, 510) are preferably made at 500 microsecond intervals in order to determine whether the radio telephone is receiving both, one, or none of the possible TDD transmissions on each channel. For each of the preferably 40 channels, the largest of the four signal strength measurements should be retained along with one other measurement offset from it by one millisecond in either direction, while the remaining two measurements should be discarded. Having determined for each of the 40 channels whether both, one, or none of the possible TDD transmission directions are above a predetermined signal strength (511), the following conclusions about the cause of the failure to establish link may be possible:

a) a channel with bidirectional communication (FIG. 5D) means that the base station is busy;
b) channels with unidirectional communication (FIG. 5E) are indeterminate; and
c) no transmissions on any channel FIG. 5F) means that the base station is out-of-range.

To determine the status in case b), the origin of any of the single-direction (unidirectional) signals needs to be found. If a single-direction signal is coming from a base station, the channel status is busy. If a single-direction signal is coming from a radio telephone, the channel status is out-of-range.

The CT-2 CAI specification does not provide any implicit differentiation between the signals transmitted by the base station and those of the radio telephone. However, the specification does allow certain types of messages to be transmitted exclusively by either the base or the radio telephone. For example, only the base is allowed to transmit messages intended to control the radio telephone's display, thus yielding a base-identifying message.

In its preferred embodiment, this invention makes use of the aforementioned exclusivity in order to identify the source of a single-direction signal, and thus to overcome the indeterminate situation with regard to the cause of failure to establish link. The invention preferably uses the periodic transmission of a radio telephone display message as base-identifying message for signals transmitted by the base station (e.g., the NULL display character would be a good choice, as it will be ignored by the radio telephone according to the present CAI specification).

Whenever a scan of all channels produces only channels with single-direction (unidirectional) transmissions, the radio telephone must synchronize itself with the data channel having one of the single-direction signals and begin searching for the presence of the periodically transmitted radio telephone display message. If such a message is found on the channel, then the signal must be from a base station, and the search may be ended with the conclusion that the base station is busy. If the message is not found on the channel, then the signal must be from another radio telephone, and the search must proceed to the next channel, and continue until all channels with single-direction signals have been searched without finding the base-identifying message, at which time an indication is provided representing a channel out-of-range status meaning that all base stations are out-of-range. Accordingly, in this case, the user should be notified of a channel out-of-range status.

Figure 6:
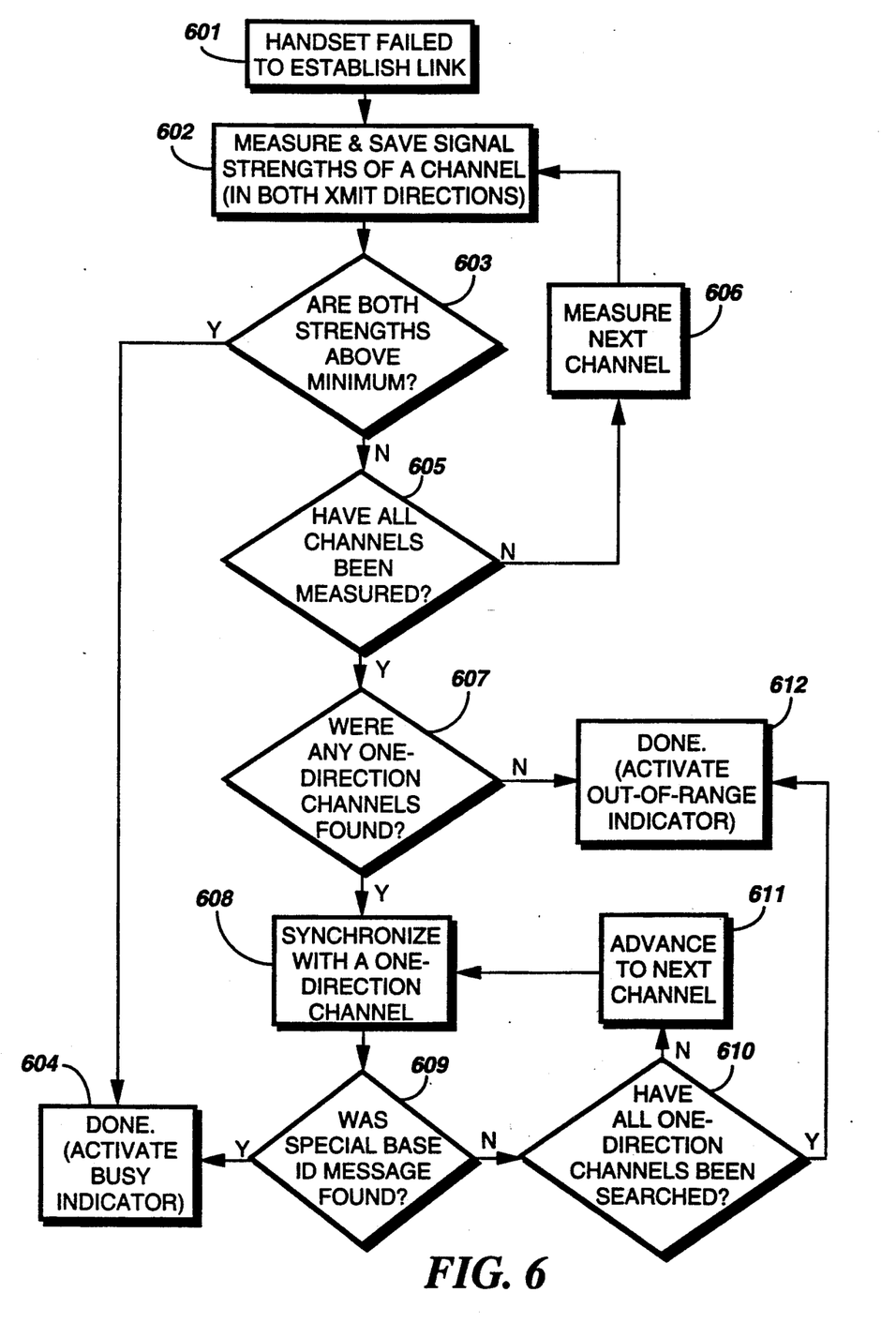
FIG. 6 is a flow diagram showing a method for determining the acquisition status of at least one frequency agile transceiver in the base station by a radio telephone in accordance with the present invention.

Referring to FIG. 6, the radio telephone (or handset) that has failed to establish a link (601) operates to measure and save (samples) the power spectrum associated with the channel in both TDD directions at a predetermined time interval (602). Step 603 tests the stored signal strengths to determine if the signal strength indication is above a predetermined magnitude. The predetermined magnitude is nominally set at a level that corresponds to a lack of an interfering signal on the channel in question. By choosing the level judiciously, the system designer can eliminate any possibility of a signal on an adjacent channel from interfering with the proper detection of the channel status. If the measured signal strengths are above the predetermined magnitude and bidirectional communication exists (both directions are present), control is passed to step 604 and an indication representing a base station busy status is provided. In the case where both signal strength are not above minimum, control is passed to step 605 where the controller tests for all channels having been measured. If all channels have not been measured, step 606 moves to the next channel and returns to step 602 to measure and save the channel's levels. Once all channels have been measured, step 605 passes control to step 607 that tests for the presence or absence of unidirectional channels. If any unidirectional channels were found, step 608 synchronizes with the received signal to determine if communication exists on the channel in question. Step 609 then tests the channel for a unidirectional communication including at least a signal validly transmitted only by the base station. If step 609 is true an indication representing a base station busy status is provided (604). If step 609 fails, that is the unidirectional communication lacks at least a signal validly transmitted only by the base station, control is passed to step 610 that tests for all unidirectional channels having been scanned. If they have not, step 610 advances to step 611, subsequently advancing the channel pointer and returning control to step 608. If all unidirectional channels having been scanned, step 610 passes control to step 612 which provides an indication representing a base station out-of-range status.

We claim:
1. In a radio telephone communication system having:
    a base station with at least one frequency agile transceiver capable of time division duplex operation on at least one radio frequency channel for facilitating communication with at least one radio telephone on the at least one radio frequency channel, a method of determining acquisition status of the at least one frequency agile transceiver in the base station comprising the steps of:

at a radio telephone:

providing an indication representing a base station busy status when one of:

requesting a communication link fails and bidirectional time division duplex communication exists on the at least one radio frequency channel; and requesting a communication link fails and unidirectional time division duplex communication exists on the radio frequency channel and the unidirectional time division duplex communication originates from the base station.

2. The method according to claim 1 wherein the requesting step comprises the steps of:

at the radio telephone:

scanning a plurality of channels to find an available channel; and transmitting a signal over the available channel to the base station, the signal representing at least a link request.

3. The method according to claim 2 wherein the scanning step comprises the steps of:

tuning the radio telephone to a channel, the channel being one of the plurality of channels; and measuring a power spectrum associated with the channel to provide a signal strength indication.

4. The method according to claim 3 wherein the measuring step further comprises the steps of:

sampling the power spectrum associated with the channel at a predetermined time interval; and synchronizing with at least one received signal to determine if unidirectional time division duplex communication exists on the channel.

5. The method according to claim 4 further comprising the steps of:

determining if the signal strength indication is above a predetermined magnitude; and providing the indication representing the base station busy status in response to the signal strength indication being above the predetermined magnitude and bidirectional time division duplex communication exits.

6. The method according to claim 4 wherein the providing step further indicates a base station busy status when unidirectional time division duplex communication exists on a channel and the unidirectional time division duplex communication includes at least a signal validly transmitted only by the base station.

7. The method according to claim 4 further comprising the steps of:

determining if the signal strength indication is below a predetermined magnitude; and providing an indication representing a base station out-of-range status in response to the signal strength indication being below the predetermined magnitude.

8. The method according to claim 4 further comprising the step of:

providing an indication representing a base station out-of-range status when unidirectional time division duplex communication exists on a channel and the unidirectional time division duplex communication lacks at least a signal validly transmitted only by the base station.

9. A radio telephone communication system, comprising:

a base station with at least one frequency agile transceiver capable of time division duplex operation on at least one radio frequency channel for facilitating communication with at least one radio telephone on the at least one radio frequency channel; and a radio telephone capable of determining an acquisition status of the at least one frequency agile transceiver in the base station, the radio telephone comprising:

means for providing an indication representing a base station busy status when one of:

requesting a time division duplex communication link fails and bidirectional time division duplex communication is exists on the radio frequency channel; and requesting a time division duplex communication link fails and unidirectional time division duplex communication exists on the radio frequency channel and the unidirectional time division duplex communication originates from the base station.

10. The radio telephone communication system according to claim 9 wherein the means for providing an indication comprises:

means for scanning a plurality of channels to find an available channel; and means for transmitting a signal over the available channel to the base station, the signal representing at least a link request.

11. The radio telephone communication system according to claim 10 wherein the means for scanning comprises:

means for tuning the radio telephone to a channel, the channel being one of the plurality of channels;

means for sampling a power spectrum associated with the channel at a predetermined time interval to provide a signal strength indication;

means for determining if the signal strength indication is above a predetermined magnitude; and means for synchronizing with at least one received signal when the signal strength indication is above the predetermined magnitude for determining if time division duplex communication exits on the channel, resulting in the indication representing the base station busy status.

12. The radio telephone communication system according to claim 11 wherein the means for providing an indication representing a base station busy status indicates said status when unidirectional time division duplex communication exists on a channel and the unidirectional time division duplex communication includes at least a signal validly transmitted only by the base station.

13. The radio telephone communication system according to claim 11 further comprising:

means for determining if the signal strength indication is below a predetermined magnitude; and means for providing an indication representing a base station out-of-range status in response to the signal strength indication being below the predetermined magnitude.

14. The radio telephone communication system according to claim 11 further comprising:

means for providing an indication representing a base station out-of-range status when unidirectional time division duplex communication exists on a channel and the unidirectional time division duplex communication lacks at least a signal validly transmitted only by the base station.

* * * * *

UNITED STATES PATENT AND TRADEMARK OFFICE
CERTIFICATE OF CORRECTION

PATENT NO. : 5,203,013

DATED : April 13, 1993

INVENTOR(S) : Breeden et al.

It is certified that error appears in the above-identified patent and that said Letters Patent is hereby corrected as shown below:

Column 7:

Claim #5

(Last word in claim) change --exits-- to --exists--.

Column 8:

Claim #11

(3rd to last line in claim) change --exits-- to --exists--.

Signed and Sealed this

Fifteenth Day of March, 1994

*Attest:*

BRUCE LEHMAN

*Attesting Officer*     Commissioner of Patents and Trademarks